July 20, 1937.  G. BAFFI  2,087,229

GAS METER

Filed Aug. 8, 1935  4 Sheets-Sheet 1

G. Baffi
Inventor

By: Glascock Downing & Seebold

July 20, 1937.    G. BAFFI    2,087,229
GAS METER
Filed Aug. 8, 1935    4 Sheets-Sheet 2

G. Baffi
INVENTOR

By: Glascock Downing Seebold
Atts.

July 20, 1937.  G. BAFFI  2,087,229
GAS METER
Filed Aug. 8, 1935  4 Sheets-Sheet 3
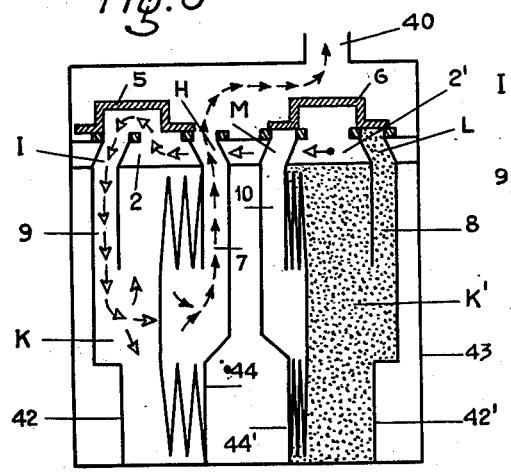
Fig. 6
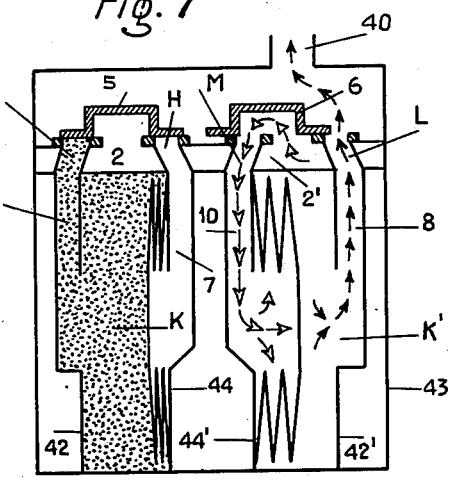
Fig. 7
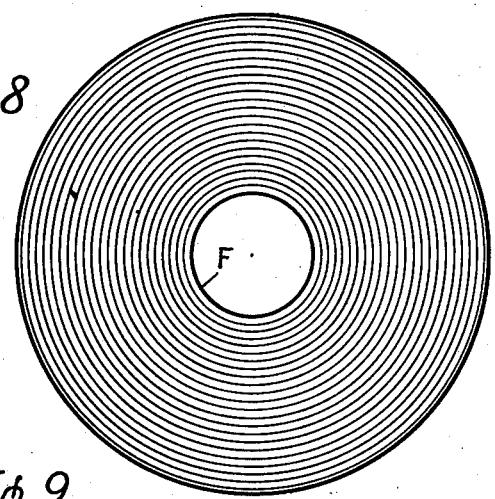
Fig. 8
Fig. 9
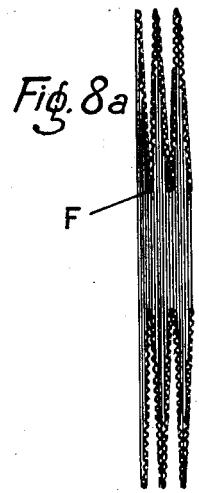
Fig. 8a
Fig. 10

July 20, 1937.  G. BAFFI  2,087,229
GAS METER
Filed Aug. 8, 1935  4 Sheets-Sheet 4
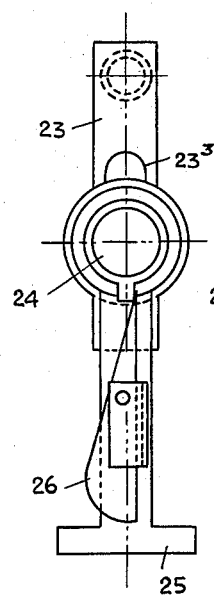
Fig. 11
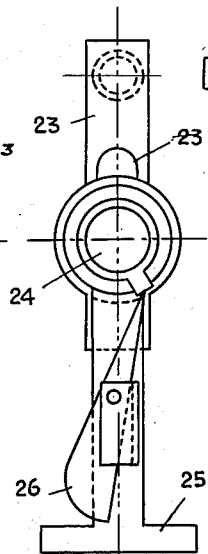
Fig. 12
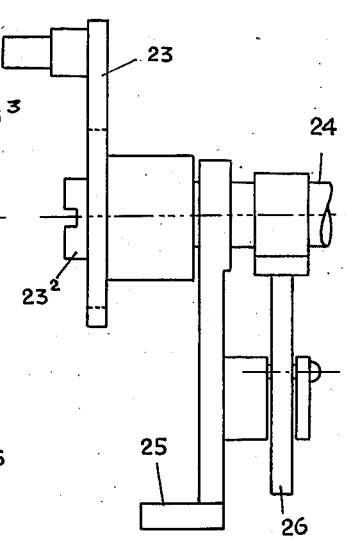
Fig. 13
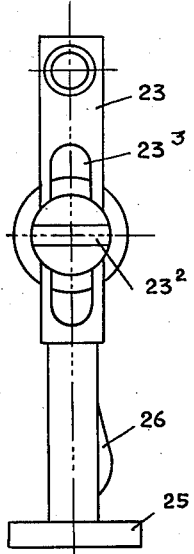
Fig. 14
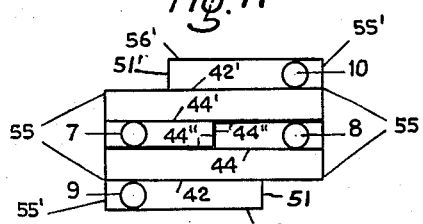
Fig. 17
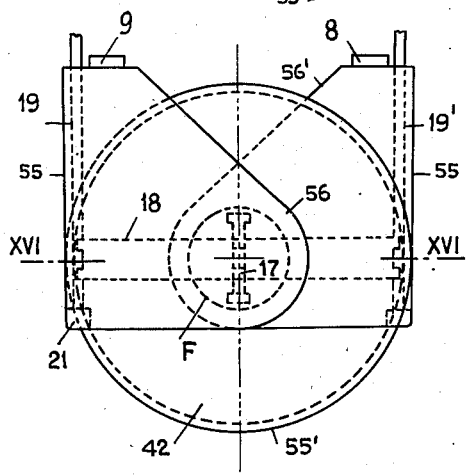
Fig. 15
Fig. 16
G. Baffi
Inventor
By Glascock Downing Seebold
Attys.

Patented July 20, 1937

2,087,229

UNITED STATES PATENT OFFICE 2,087,229

GAS METER

Giuseppe Baffi, Genoa, Italy

Application August 8, 1935, Serial No. 35,381
In Italy August 27, 1934

4 Claims. (Cl. 73—263)

The invention refers to a new type of dry gas meter having instead of the usual bellows of goatskin or the like, bellows made of metallic membranes.

The purpose of the invention is to eliminate the inconveniences of dry gas meters with leather bellows which only become apparent after a certain time, when the leather perishes.

A further advantage of the invention is the fact that the gas meter, although it registers perfectly accurately, may be of small size, and in proportion to its capacity.

The satisfactory working of the usual gas meters with leather bellows depends upon the quality of the leather and its tanning, but the construction of the gas meter according to the invention is independent of this and other circumstances which practically cannot be controlled, as for example the fact that a stock of hides, even if they are all tanned by the same tanner, never show exactly the same characteristics.

Further purposes and advantages of the invention will be apparent from the following specification by reference to the attached drawings, in which:

Figures 4 to 7 are working diagrams of the gas meter according to the invention.

Figure 8 is a perspective view of a part of a bellows according to the invention.

Fig. 8a is a diametrical section of one of the bellows walls in inflated position.

Figs. 9 and 10 are enlarged cross-sections of one of the metallic members in flat and inflated position respectively.

Figs. 11 and 12 are detailed views of the arrangement of the stop device for avoiding the reverse movement of the crank shaft.

Figs. 13 and 14 are views at right angle of one of the cranks, showing the device for effecting the regulation of the length of this arm.

Fig. 15 is a front elevation of the casings containing the bellows and annexed parts.

Fig. 16 is a section on line XVI—XVI of Figure 15; and

Fig. 17 is a plan view at a reduced scale of the casings shown in Fig. 15, with shafts 19, 19' omitted.

According to the invention the bellows of the new gas meter are made of a certain number of round metallic plates with concentric corrugations, and having a circular centerhole, as shown in Figure 8, thus forming large circular discs which are alternately connected to each other at the border of the centerhole and at their external border thus forming a resilient bellows the capacity of which varies between a maximum and a minimum quantity, but is, however, adjustable.

This adjustment may be effected by varying the length of the crank arms transmitting the movements of the bellows to the counter, as will be more fully described hereinafter with reference to Figures 13 and 14 of the drawings.

Figure 3:
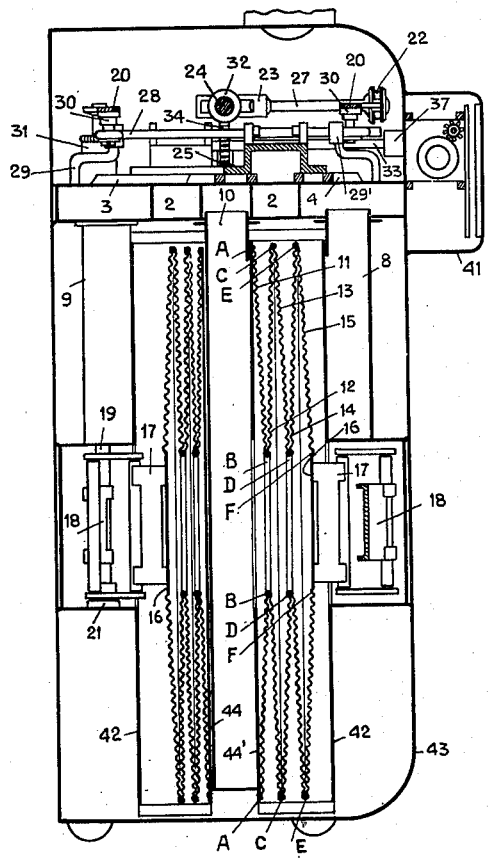
Figure 3 is a section taken on the line III—III in Figure 1.

The connection is performed, as shown in Figure 3, particularly by attaching the outer end 11 of the first plate A—B of the series tightly to the rigid wall 44' of the inner casing of the bellows, by then connecting alternately the inner borders at the center-hole by means of rings 12 and 14, and connecting the external borders of the corrugated metallic membranes by means of the rings 13 and 15; or more exactly, by connecting the inner border of the membrane A—B with that of B—C and the inner border of C—D with that of D—E, and the external border of the membrane B—C with that of C—D and the external border of D—E with that of E—F, the centerhole of the latter being closed by the disc 16.

Among the different metals tried for the construction of these bellows, pure tin has proved the best, as it resists corrosion perfectly and when stamped with concentric corrugations arranged very close together, becomes perfectly resilient and everlasting. In practice it is advisable to use stamped tin sheets in thicknesses from 1 to $\tfrac{3}{10}$ of a mm. according to the capacity of the bellows or the measuring capacity of the gas meter the distance between two adjacent corrugations being not more that 4 mms., the most suitable being approximately 3 mms. with a depth of $\tfrac{8}{10}$ of a mm.

The bellows made in this way are mounted in cylindrical casings, one of the borders of the terminal plate (preferably the external one) being firmly attached to one of the walls 44 of the casing 42—44. Into the centre of each casing opens the conduits 7 and 10 respectively, Figures 4 to 7, the other end of each conduit connects with one side of the seats of the distribution valves, while the inlet and distribution conduit 9 and 8 for the gas measured by the bellows leads to the opposite walls adjacent the ends of the outer plate E—F of the bellows.

As apparent from Figs. 15 and 16, the casings are made by welding or soldering the different walls of the casings 42 and 44, 42' and 44'. Also the casing 41 is attached to the casing 43 by soldering. The rear walls of casings 42, 44 and 42', 44' are soldered to the side walls of the outer casing 43 after the various parts have been consecutively arranged within these casings and soldered or welded where necessary.

The bellows are arranged in pairs, that is: two for each meter, and each bellows has its separate casing 42, 44 or 42', 44' in communication with the ports in the seat of the distribution valve by means of the conduits 7 and 9, and 8 and 10. The casings are constituted, see particularly Figs. 15 and 16, by attaching to an outer cylindrical wall 55 having outwardly projecting flaps 55', a number of internal disc shaped walls 44, 44', to which one of the end membranes of the bellows are attached. Each of the walls 44, 44' is perforated near the center and each perforation leads into a separate chamber 7' and 8' corresponding to the conduits 7 and 8 shown in Figures 4 to 7. After the bellows have been inserted and attached to the walls 44, 44', the disc walls 42, 42' are welded within the cylindrical walls 55, the hinge members 17 are attached to the disc plate 16 closing the outer ends of the bellows, the levers 18 and shafts 19 are mounted at the junction point of the walls 42, 42' with flaps 55' and the remaining walls 56, 56' and 51, 51' are welded to the flaps 55' and walls 42, 42'. The complete inner casing has thus the form of a cylinder having two outer prismatical parts, the cylindrical part carrying the conduits 7 and 10 leading to the interior of the bellows and the outer trapezoidal parts carrying the conduits 9 and 8 leading to the interior of the casings outside of the bellows. On the disc 16 which closes the hole of the terminal membranes a hinge bearing 17 is welded, which by means of a lever 18 is connected to a vertical shaft 19 journalled in a thrust bearing 21 and in a stuffing box 31 arranged in the partition of the outer casing above which is a chamber leading to the outlet pipe 40 and in which the control devices of the registering mechanism are fitted. The bearing 21 is supported by the bottom wall 51, 51' welded to the wall 42, 42' of the casings containing the bellows. Shaft 19 is inserted within the outer projecting part of the casings containing the bellows.

Each of the two vertical shafts 19 and 19' (one for each bellows) is connected to a lever 20, 20' attached to their upper end and running in a horizontal direction and crosswise to the meter. The two levers 20 and 20' by means of ball links 22, 22' are connected to connecting rods 27, 27' which operate the adjustable crank arms 23, 23' which are displaced 90° and act on the shaft 24 of the registering mechanism. The crank arm 23 is slotted as shown at 23³ in Figure 14 and the adjustment is effected by registering the position of the screws 23² along the slot 23³. On this shaft a worm 32 is fastened in mesh with a worm wheel 34 fastened to the counter-shaft 33 of the registering mechanism.

On the levers 20 and 20' are also linked at 30, 30' the draw bars 28 and 28' operating the distribution valves 5 and 6 which control the inlet of the gas to the bellows and its outlet from these two bellows, as described more fully hereunder. The draw bars 28 and 28' of the distribution valves are slidably supported through guides 29, 29'.

A pawl 26 acting on a ratchet wheel or the like prevents the shaft 24 from turning in the wrong direction.

Figure 1:
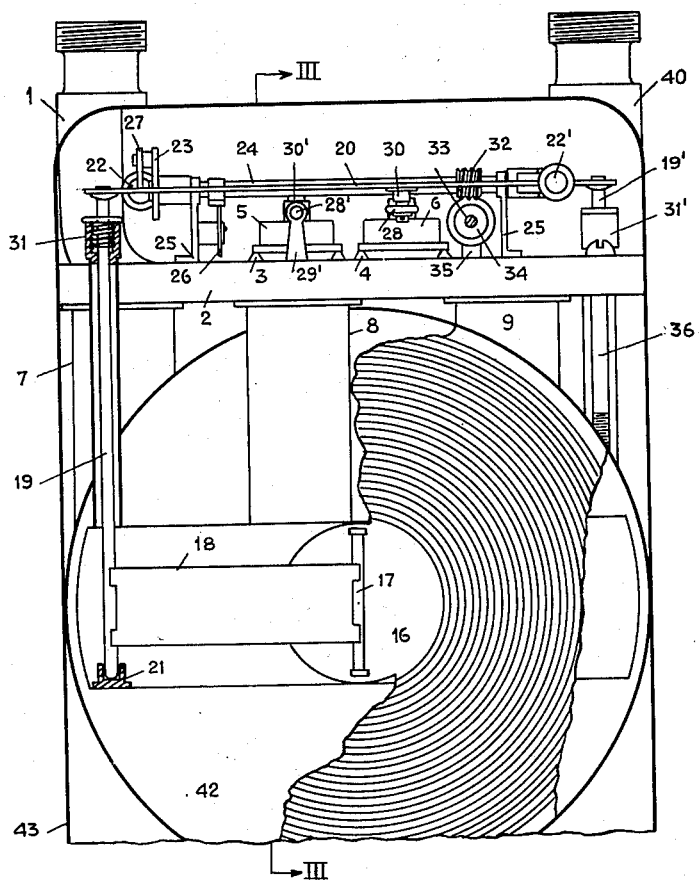
Figure 1 is a front view of a gas meter with the front part of the casing and a part of one of the bellows casings and the registering mechanism removed.
Figure 2:
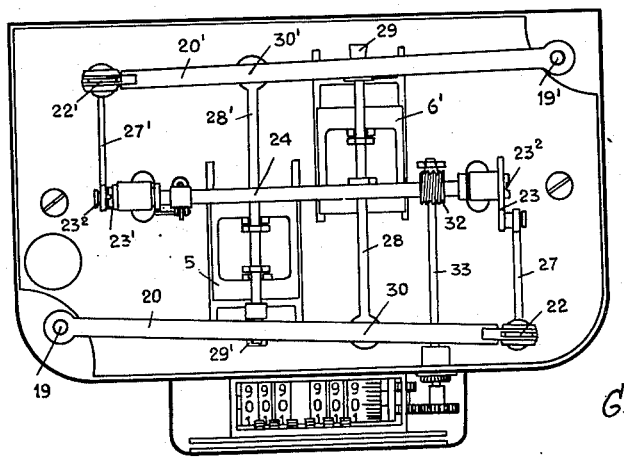
Figure 2 shows the counter and the valve and their operating mechanism viewed from above.

The operation of the improved gas meter according to the invention is the following:

The gas admitted by the inlet pipe 1 is supplied to the conduits 2 and 2' leading beneath the central post of the valve seats 3 and 4 of the distribution valves 5 and 6. The element 36 in Fig. 1 is a long screw serving for fastening the member 2 to the casings. This is a mere constructional detail.

Figure 4:
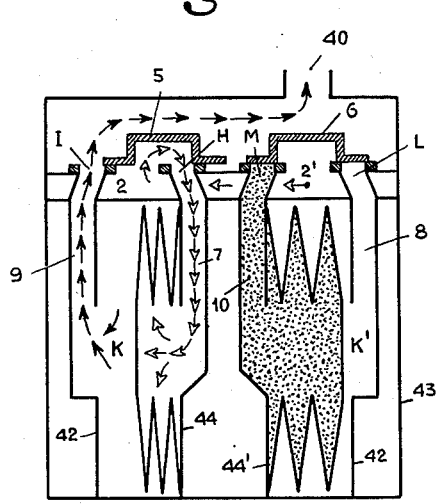
Figure 5:
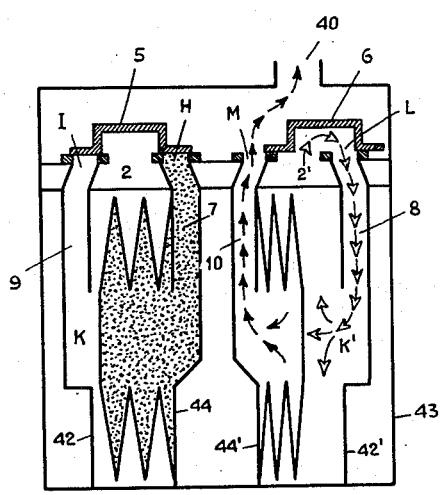

In Figure 4 one of the phases of the distribution of the gas is shown. The valve 5 is moved to the right thus uncovering its left-hand port I in order to open communication between outlet pipe 40 and the casing 42, 44 which is already filled with gas in its outer chamber, while the other port H of the valve seat which is in communication through the conduit 7 with the interior of the bellows, is put into communication with the inlet conduits 2 and 2'.

In this way the gas causes the bellows to swell and drives out the gas contained in the casing 42, 44 outside the bellows which through the pipe 9 and the port I of the distributing slide valve passes into the chamber where the control valves are housed and to which the outlet pipe 40 is connected. The counter is in a separate casing 41 welded to the front walls of casing 43. The slide valve 5 is in its full open position and therefore, on account of the connection of the rods 23 and 23' with shaft 24 so as to be displaced at an angle of about 90°, the other valve 6 is in the fully closed position whereby the gas outlet takes place only through the port I. The shafts 19—19' are fitted within the outer projecting parts of casings 42, 44 and 42', 44'. The function of the said casings is to provide supporting means for the bellows and attached parts and to provide chambers for the exact measuring of the gas. The function of these casings is apparent from the description of the operation of the device with reference to Figures 4 to 7 of the drawings.

By the rotation of both cranks, the port M, which is in communication with the interior of the other bellows by means of the pipe 10, is opened and for a certain time the outlet of gas takes place simultaneously through ports I and M, until the ports I and H (Figure 5) are closed, which happens when the chamber K is nearly empty and the bellows arranged inside is fully inflated. In this position the chamber K' is filled through the conduit 2' while the corresponding bellows in casing 42', 44' is being emptied through the port M.

Upon a further rotation of the crank, the slide valve 6 closes little by little the two ports M and L, while the slide valve 5 opens the ports H and I, but from the side opposite to that shown in Figure 4. In this position the gas is being discharged from within the bellows in chamber K through the conduit 7 and port H and new gas is led into the chamber K to fill the space outside of the bellows. On the other side of the casing the filling of the chamber K' outside of the bellows therein and the emptying of this bellows continue until complete closure of ports M and L by the slide valve 6. At this moment the chamber K' is completely filled and the corresponding bellows are completely deflated, see Fig. 6.

Upon moving the slide valve 6 still further to the left, the port M of conduit 10, see Fig. 7, is put in communication with the port 2', while the slide valve 5 closes completely the ports I and H, as shown in Figure 7. In this position the chamber K is completely filled with gas and the corresponding bellows are completely deflated. On the other side of the casing the gas from the conduit 2' fills through port M and conduit 10 the bellows within the chamber K', which being inflated, presses the gas within chamber K' through conduit 8 and port L to the outlet 40.

At this moment the chamber K is completely filled with gas and the delivery takes place from the chamber K'; on the return stroke of both slide valves, after the valve 6 has reached its fully open position, the ports I and H are opened again, while M and L are closed, thus returning to the position shown in Figure 4, and the cycle is repeated.

The gas pressure, besides operating the bellows in the above described manner, due to their connection with the vertical shafts 19, 19' by means of the hinge bearings 17, also operates the distributing slide valves 5 and 6 and the driving mechanism of the registering apparatus by the crank drive 23 and 23'. The exact adjustment of the maximum capacity of the bellows, and consequently of the meter, is effected by regulating the length of the crank arms 23 and 23' by means of the adjustment screw $23^2$ which engage slots $23^3$ in said crank arms, Figs. 13 and 14.

From the foregoing it is apparent that a new type of dry gas meter which is reliable in operation has been provided, which has been deprived of all members, the regular working of which depends on incalculable circumstances. Furthermore, a better arrangement of the driving mechanism has been obtained by fitting both levers 20 and 20', for transmitting the movements of the bellows, transversely of the meter; a lighter operation has also been obtained due both to the features inherent to the metallic bellows and to the simplification of the driving device of the meter, which means a smaller fall of gas pressure.

It is, therefore, apparent that the invention may undergo many modifications without departing from the basic principle thereof. Thus the shape and the arrangement of the metallic bellows, or the form of the corrugations may be varied, and also the material employed for their construction; or the form of the distributing valves, which may be of any suitable kind.

Having now described my invention, what I claim as new and desire to secure by Letters Patent is:

1. A dry gas meter comprising a casing having a measuring chamber, two metallic bellows, a separate rigid case for each bellows, each of said bellows consisting of a number of closely corrugated membranes having a central opening and being joined alternately at the edge of the center opening and at the outer edge to other like membranes, one of the end membranes being connected at its outer edge with the rigid wall of the case of the bellows, a rigid disc closing the center opening of the other end membrane of each bellows, a lever hinged to each disc, distributing valves and registering apparatus in said casing, means including shafts adapted to operate said valves and registering apparatus, said levers adapted to transmit the movement of the bellows to the corresponding shaft which operates the distributing valves.

2. A dry gas meter according to claim 1, wherein the membranes are in the form of metallic disc plates each having a relatively large central opening, and the corrugations are arranged in concentric form around said opening.

3. A dry gas meter according to claim 1, in which the membranes are made of pure stamped tin in thicknesses from 1 to $\frac{3}{10}$ mm.

4. A dry gas meter according to claim 1, in which the stroke of the bellows is substantially reduced, said means including crank arms in said casing and a transversal arm, the movements of the bellows being transmitted to the crank arms for actuating the registering apparatus through one end of said transversal arm extending from side to side of the meter and being attached at the other end to one of said shafts.

GIUSEPPE BAFFI.